Feb. 18, 1969
D. L. JAFFE
3,427,956
AUTOMATIC PANCAKE BAKER
Filed May 3, 1967
Sheet 2 of 5
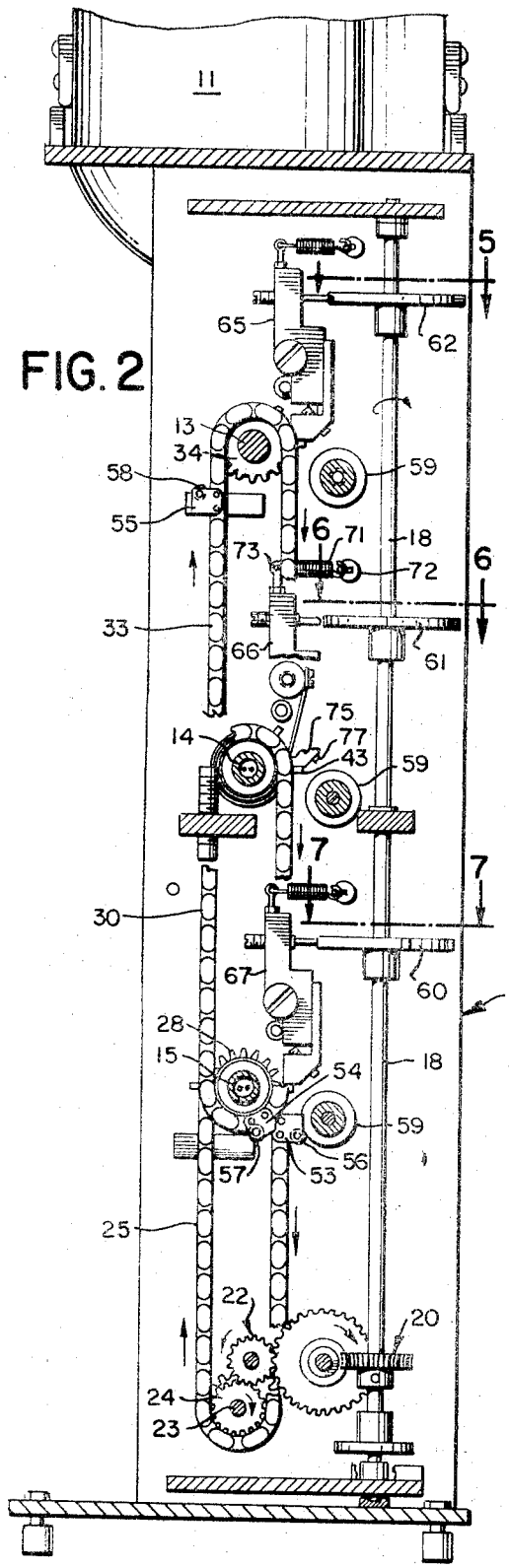
FIG. 2
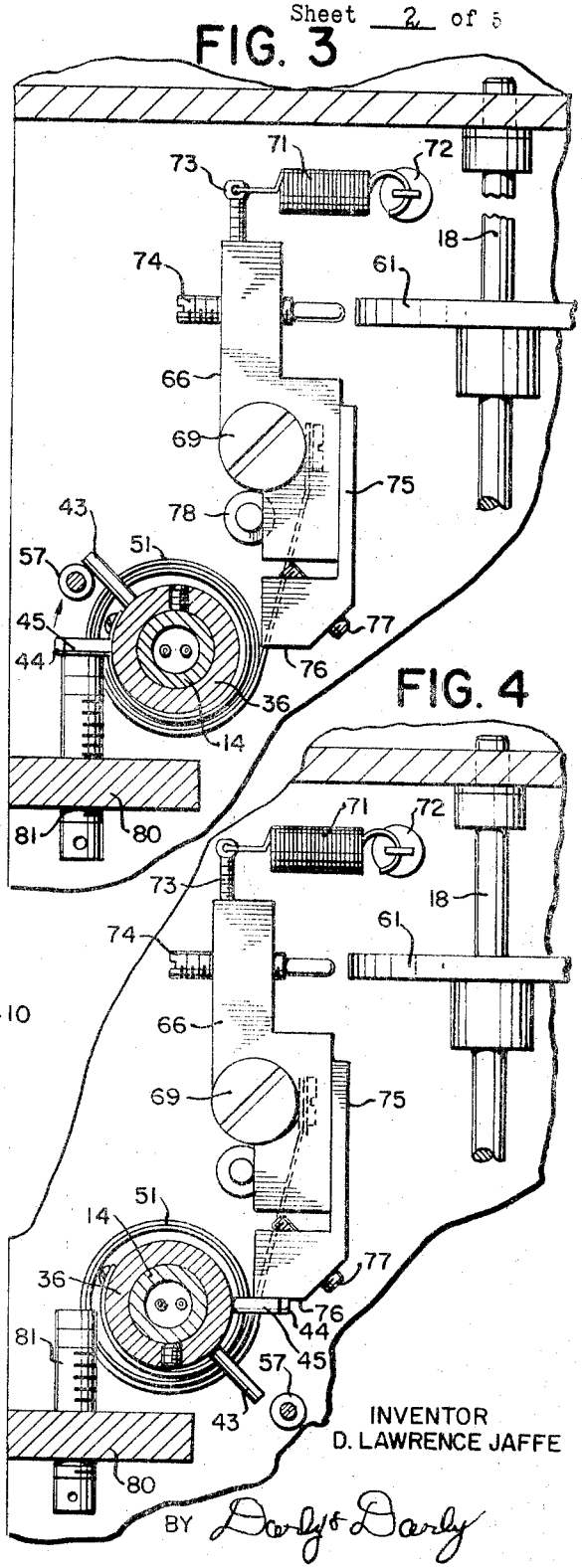
FIG. 3
FIG. 4
INVENTOR
D. LAWRENCE JAFFE
BY Darby & Darby
ATTORNEYS

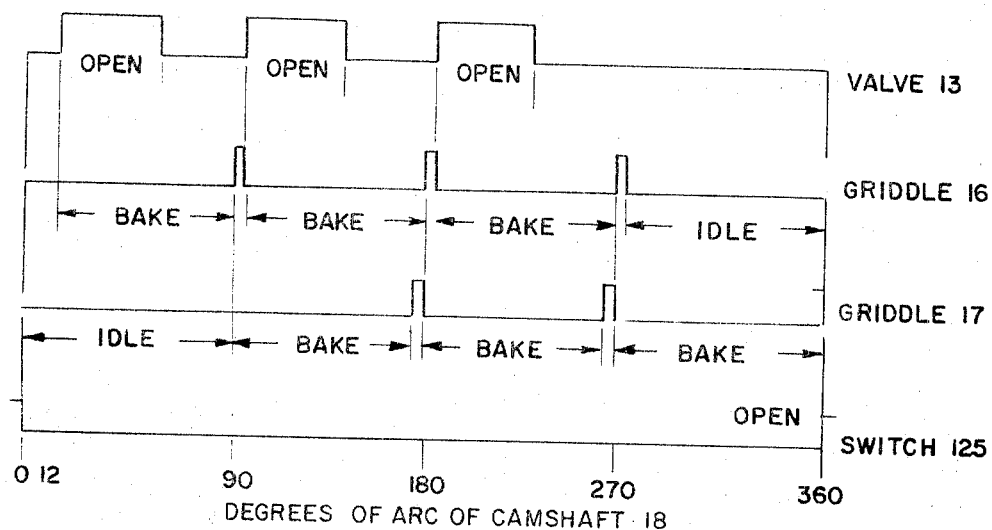
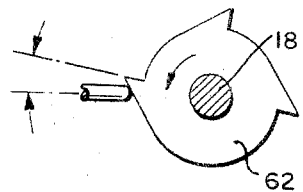
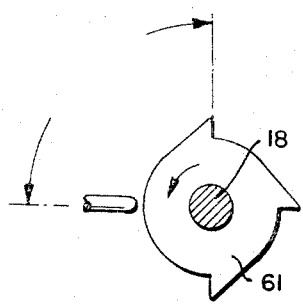
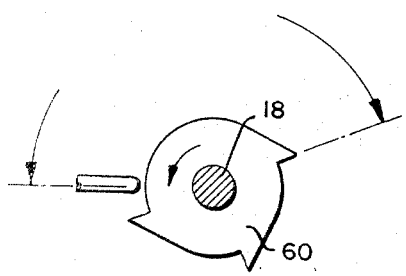
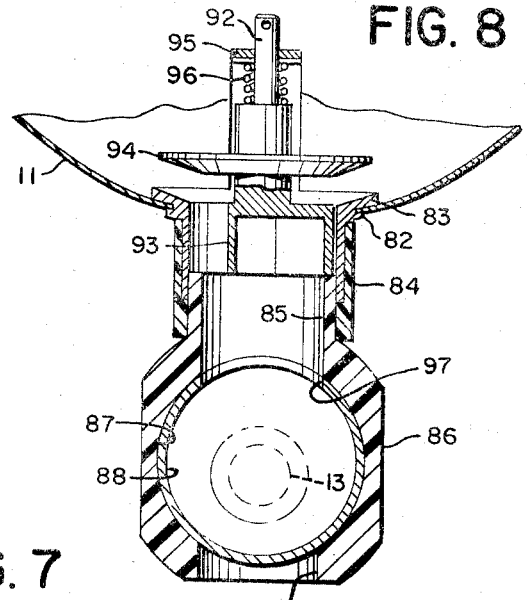

Feb. 18, 1969  D. L. JAFFE  3,427,956
AUTOMATIC PANCAKE BAKER
Filed May 3, 1967  Sheet 4 of 5

INVENTOR
D. LAWRENCE JAFFE

BY *Harvey F. Danly*

ATTORNEYS

United States Patent Office 3,427,956
Patented Feb. 18, 1969

3,427,956
AUTOMATIC PANCAKE BAKER
David Lawrence Jaffe, Great Neck, N.Y., assignor to Polarad Electronics Corporation, Long Island City, N.Y., a corporation of New York
Filed May 3, 1967, Ser. No. 635,810
U.S. Cl. 99—423                                15 Claims
Int. Cl. A47j 37/10, 37/04

ABSTRACT OF THE DISCLOSURE

The following specification discloses an automatic pancake baker which comprises a hopper for batter, a metering valve controlling discharge of batter from the hopper, a first griddle arranged immediately beneath the hopper, and a second griddle arranged immediately beneath the first griddle. Timing and control means are provided so that a measured amount of batter is discharged from the hopper through a metering valve onto the first griddle. This first griddle, after a predetermined time, rotates through 180 degrees under spring drive, while at the same time a spatula is moved about the griddle to loosen the pancake therefrom. The pancake is thus discharged in an upside-down condition on the second griddle, which after a predetermined time for baking on the second side, rotates through a 180 degree arc, also under drive of a spring, and also with a spatula operating to loosen the pancake, and discharges the pancake onto a plate placed beneath that second griddle. The metering valve and griddles are restored to operating position under positive drive. Three pancakes are baked and stacked on the receptacle, after which the motor stops and the machine remains idle until the control switch is again closed.

---

The invention is related to the field of automatic baking, particularly the field of automatic baking of pancakes and specifically to the automatic pancake baker described in my prior Patent No. 2,830,529 issued Apr. 15, 1958, and assigned to the assignee of this application.

As set forth hereinabove, the invention is the provision of an automatic pancake baker which is more rapid in its action than other devices of this character, and which is provided with spring means to rotate the griddles to their discharge position to serve to increase this speed. Additionally, the machine includes spatula means which are automatically operated as the pancake griddles are rotated to their discharge positions, to thus assure that the pancakes do not adhere to the griddle, but are discharged therefrom at the proper moment. The machine also provides a detachable batter holder and metering valve which may thus readily be cleaned and filled and which is adapted to accurately measure the amount of batter to be deposited on the griddle. Also, timing and control means are provided for cycling the machine through a cycle which makes a predetermined number of pancakes, after which the machine stops and awaits re-starting by an operator.

Various objects and features of the invention will be apparent when the following description is considered in connection with the annexed drawings in which:

FIGURE 2 is a vertical cross-sectional view taken on the plane of the line 2—2 of FIGURE 1, showing particularly the cam and cam shaft, together with the chain drive elements which restore the griddles and metering valve to their initial positions;

FIGURE 3 is another vertical cross-sectional view on an enlarged scale, showing particularly the drive and restoring means for one of the griddles. In this view, the shaft is shown when it has been released and is being returned to its original position;

FIGURE 4 is a view similar to FIGURE 3, but illustrating the positions of the parts when the restoration of the shaft to its original position has occurred;

Figure 1:
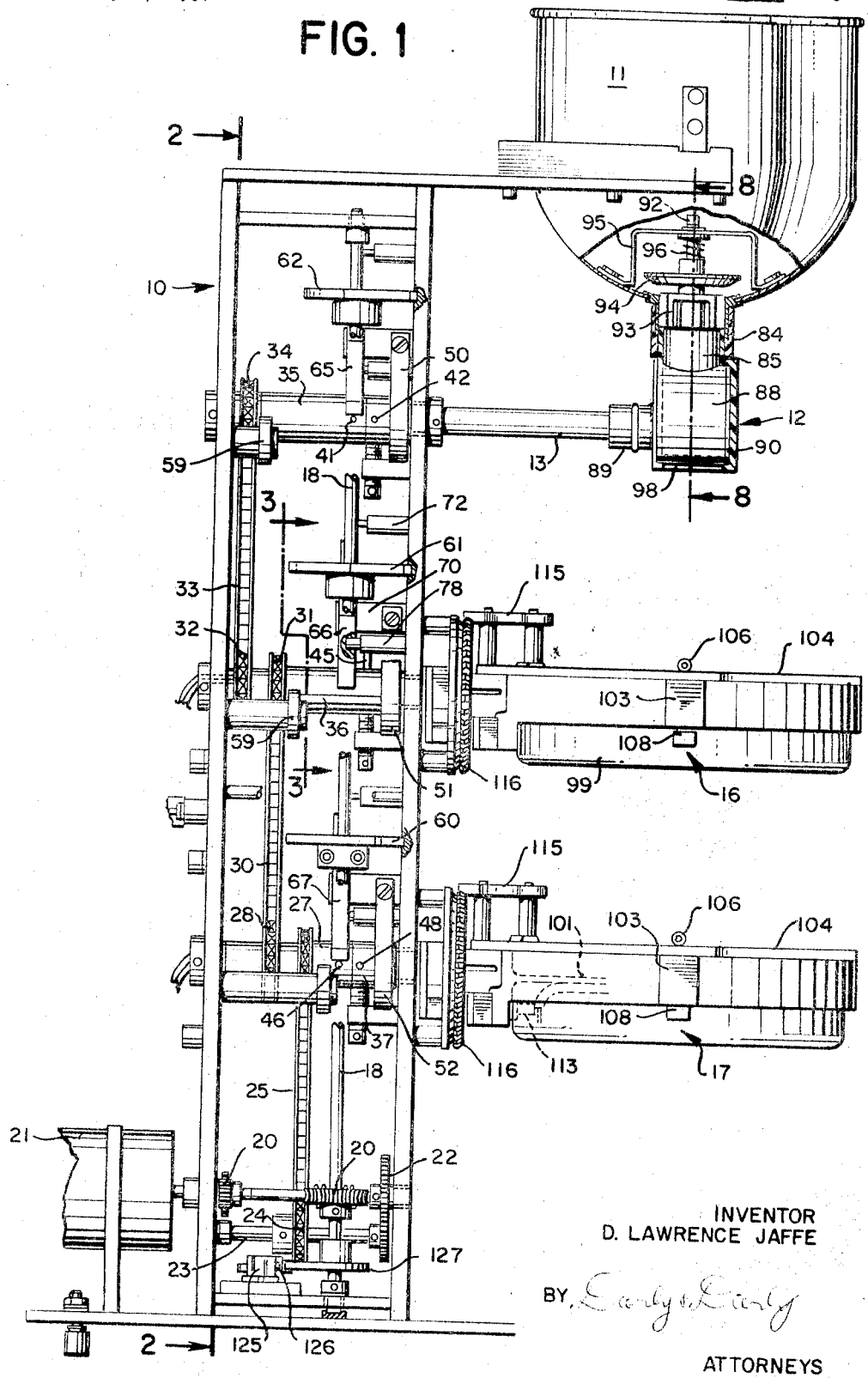
FIGURE 1 is a side-elevational view of the pancake baker of my invention, the view showing the batter metering valve in vertical cross-section.
Figure 9:
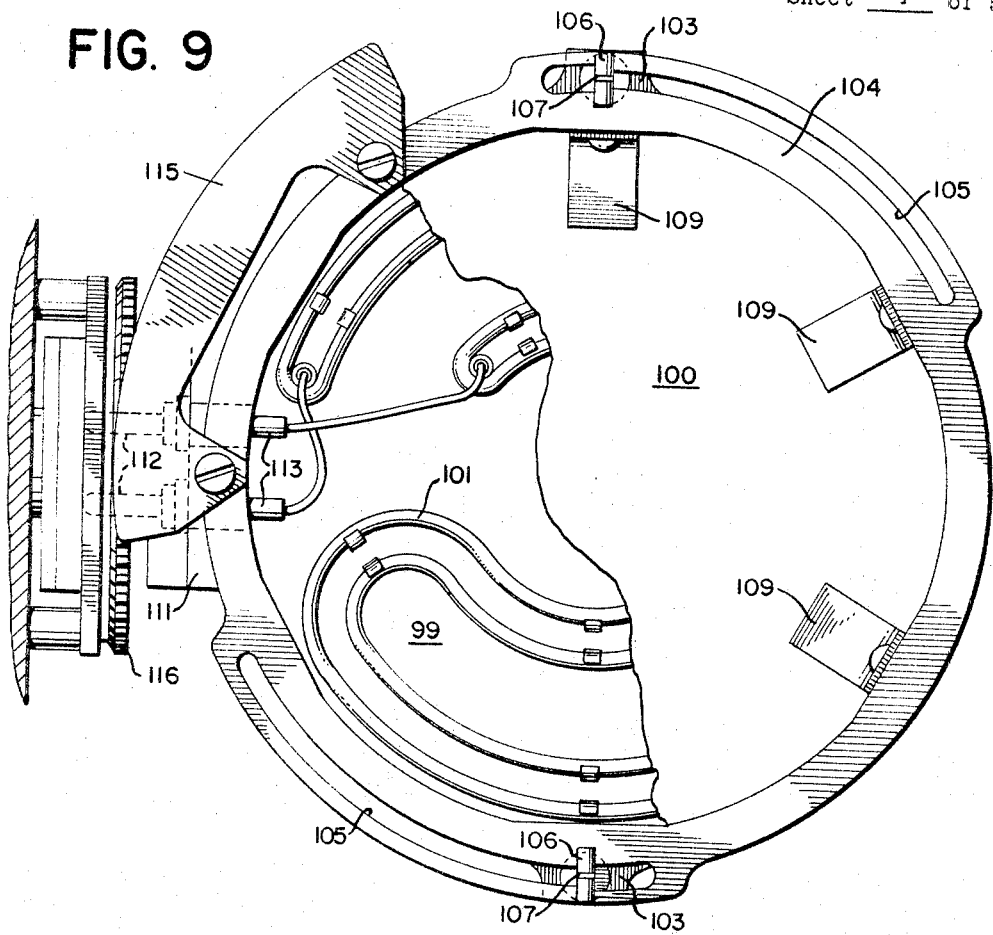
Figure 10:
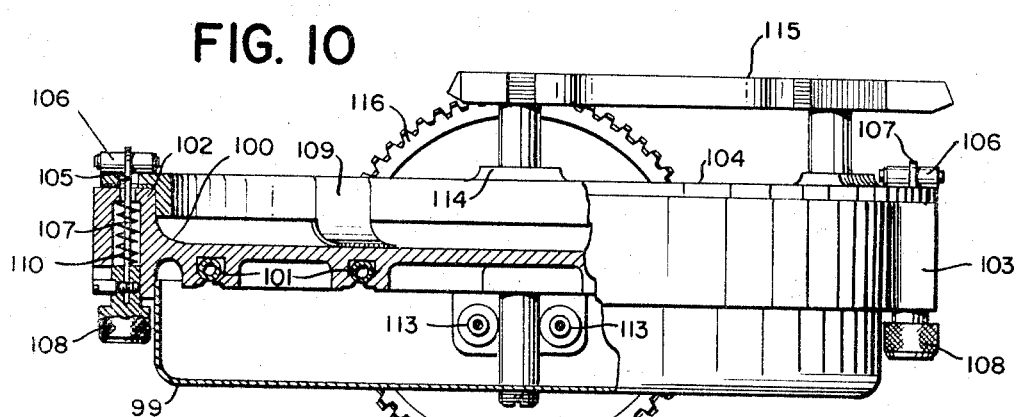

FIGURES 5, 6, and 7 are respectively horizontal sectional views on the planes of the lines 5—5, 6—6, and 7—7 of FIGURE 1, these views taken together showing the position of the controlling cams relative to each other, the cam positions being that occupied at the time the machine operation is initiated;

FIGURE 8 is a vertical, cross-sectional view of the metering valve of FIGURE 1, the view being taken on the plane of the line 8—8 of FIGURE 1;

FIGURE 9 is a top-plan view of a griddle with parts broken away to show the heating elements, the mounting of a spatula ring, and other constructional details;

FIGURE 10 is a front-elevational view of a griddle, having parts broken away to show the construction thereof;

FIGURE 11 is a timing chart showing the cycle of operation; and

Figure 12:
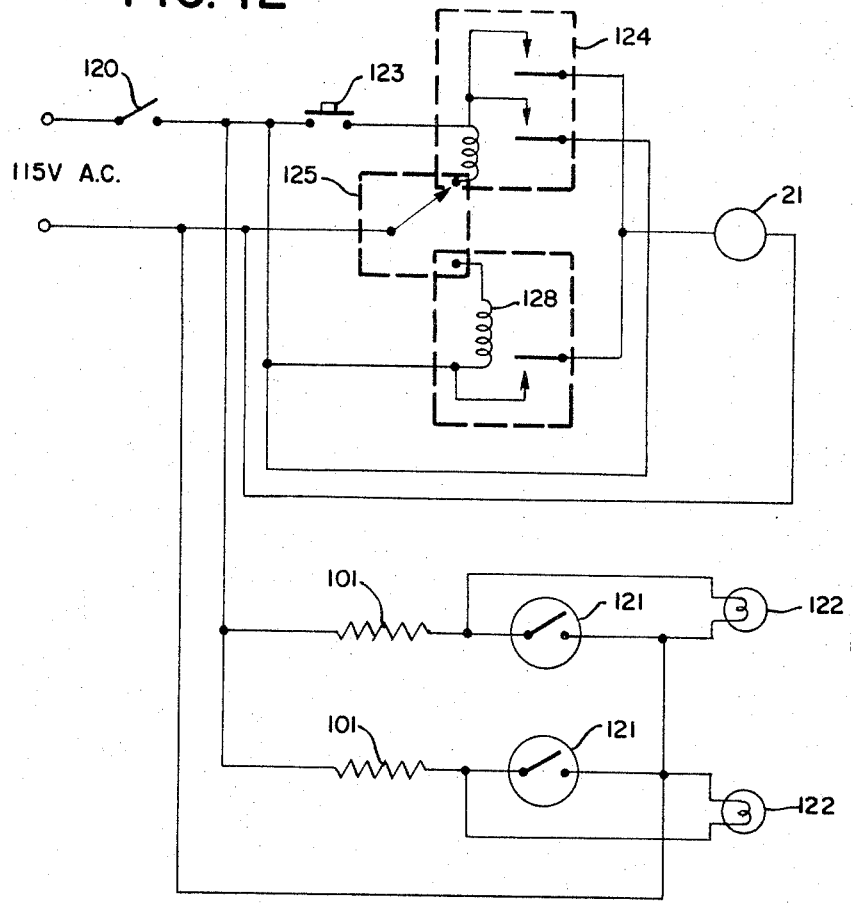

FIGURE 12 is a schematic wiring diagram of the control circuit.

Referring now to the drawings and particularly to FIGURES 1 and 2, it will be seen that the machine comprises a framework 10 on which is detachably mounted a batter hopper 11, including a batter metering valve generally designated 12. Rotatably mounted in suitable bearings in the frame 10 are three shafts 13, 14, and 15. Shaft 13 is connected in a manner which will appear later, to the metering valve 12, while shafts 14 and 15 are connected respectively to an upper griddle 16 and a lower griddle 17.

Extending vertically in the framework 10 and mounted for rotation in suitable bearings, is a cam shaft 18, which cam shaft is driven through gearing designated 20 by a motor 21. Also driven by the motor 21 through additional gearing indicated at 22 is a transverse shaft 23 on which is mounted a sprocket wheel 24.

Sprocket wheel 24 is coupled by means of chain 25 to sprocket wheel 27 rotatably mounted on shaft 15. Integral with sprocket wheel 27 is a sprocket wheel 28 which drives a chain 30 which in turn drives a sprocket wheel 31 mounted for rotation with respect to the shaft 14. Fixed for rotation with the sprocket wheel 31 is a second sprocket wheel 32, which drives a chain 33 and through it a sprocket wheel 34, mounted for rotation upon the shaft 13. It should be noted at this point that the gear ratio through the gearing 20 and 22 is such that the cam shaft 18 operates through a complete revolution during the time that it takes any one of the chains 25, 30, and 33 to operate through four complete cycles and return to the starting point.

Fixed to the shafts 13, 14, and 15, respectively, are the sleeves 35, 36, and 37. Each of the sleeves 35, 36, and 37 has fixed thereto three radially extending pins which are respectively, a drive pin, a latch pin, and a stop pin. The drive, latch, and stop pins for sleeve 35 are designated respectively, 40, 41, and 42; those for sleeves 36, 43, 44, and 45; and those for sleeves 37, 46, 47, and 48.

Each of the sleeves 35, 36, and 37 has affixed thereto one end of a torsion spring, these springs being designated 50, 51, and 52, respectively (FIG. 1). At their opposite ends these springs 50, 51, and 52 are affixed to the frame in any suitable manner.

Fixed to one link of each of the chains 25, 30, and 33 is a bracket, the brackets being designated 53, 54, and 55, respectively; each bracket carries a pin-mounted roller which extends horizontally therefrom, in position to engage with the respective drive pin. The chain bracket rollers are designated 56, 57, and 58, respectively (FIG. 2).

Referring now particularly to FIGURES 1, 5, and 6, it will be seen that the cam shaft 18 carries thereon three cams 60, 61, and 62, which cams are respectively associated with latches 65, 66, and 67.

Since the construction and operation of the shaft sleeves, springs, pins, and chain drive pins is substantially the same for all shafts and shaft sleeves, reference is now made to FIGURE 3, which shows the association of the release cam and latch with the drive mechanism for shaft 14, that is, the upper griddle shaft.

The latch 66 is pivotally mounted near its center by means of screw 69 on a stud 70, which is fixed to the frame and extends to the left from the right-hand member of the frame, as seen in FIGURE 1. Latch 66 is urged in a clockwise direction as seen in FIGURES 2 and 3 by means of a coil spring 71, one end of which is fixed to the stud 72 extending from the frame, and the other end of which is fixed to the screw eye 73 extending upwardly from the latch or lever 66.

Adjustably mounted in the upper arm of the lever 66 is a screw 74, the rounded point of which lies in position to be operated by the cam 61 during its rotation. At the lower end of the pawl 66, an adjustable member 75 is provided in order that the vertical position of the actual latching surface 76 may be adjusted. The adjustment is made by use of the screw 77. A further stud 78 extends to the left from the right-hand frame member and serves to limit the movement of latch 66 in the clockwise direction under urge of the spring 71.

Mounted in a threaded hole in a bracket 80 also fixed to the frame is a stop screw 81 which cooperates with the stop pin 45 of the sleeve 36 to arrest the movement of shaft 14 and sleeve 36 in a predetermined position.

As seen in FIGURE 3, the chain 30 has been operated to a position in which the drive roller 57 has come into contact with the drive pin 43, and is about to rotate the shaft 14 in a counterclockwise direction, winding the torsion spring 51. It will be noted that at this time the stop pin 45 lies against the head of the stop screw 81, that is, the griddle at this moment is in its operated position and a pancake has been discharged from the surface thereof.

As the rotation of the shaft 14 continues under urge of the drive roller 57, the latch pin 44 engages the latch 66 and causes counterclockwise movement thereof, and after the pin 44 has passed slightly beyond the latch, and the drive roller 57 disengages from pin 43, the latch 66 moves in a clockwise direction and lies above the pin 44, thus holding the shaft with its griddle in upright position against the urge of spring 51 as is seen in FIGURE 4. It should be noted that nylon rollers such as roller 59 (FIGS. 1 and 2) are mounted on studs and cooperate with the drive rollers such as 57 to assure that any slack in the chain is ineffective to cause premature disengagement of the drive rollers from the corresponding drive pins.

At the proper time in the cycle, cam 61 engages the rounded end of screw 74, operating the latch in a counterclockwise direction and permitting the shaft to rotate through a 180 degree arc, at which time the motion is arrested by engagement of the stop pin 45 with the stop screw 81.

As above indicated, the three shafts 13, 14, and 15 are operated in a similar manner under urge of their springs and are returned to initial position under drive of the respective drive pins and chains.

The shaft 13 is, as has been indicated, the drive for a metering valve 12, which is positioned beneath the batter hopper 11, a portion of the valve mechanism being mounted in the batter hopper 11 and the entire valve and hopper detachably mounted to readily be removed from the machine for cleaning and filling.

Referring now particularly to FIGURES 1 and 8, it will be seen that the hopper 11 has an aperture 82 therein, in which is fitted a flanged sleeve 83 to which an outer sleeve 84 is fixed. Reciprocally mounted in the sleeves 83 and 84 is an upwardly extending cylindrical sleeve-like portion 85 of a housing member 86, which housing member has a cylindrical bore 87 extending from the rear (left-hand FIG. 1) wall to position adjacent the front wall 90. In the bore 87 is mounted a cylindrical valve member or drum 88 which is detachably coupled to the shaft 13 by any suitable means, the center of the drum being eccentric to the shaft as indicated in FIGURE 8.

Mounted in the upper portion of the flanged sleeve 83 is a plunger 92 having radially extending vanes 93, the lower ends of which rest on the rim of the sleeve member 85. Plunger 92 carries a valve disc 94 thereon and the upper stem of plunger 92 extends through an aperture in a strap 95 which is detachably fixed to the interior of the batter holder or hopper. A coil spring 96 urges the plunger 92 to its lower position.

Valve member 88 has a circular aperture 97 which communicates either with the interior of the housing portion 85 or with the interior of an aligned vertical bore in the lower portion of the housing shown at 98.

Thus, when the parts are in the position shown in FIGURE 8, the valve disc 94 is lifted and batter can flow from the batter holder 11 to the upper extension 85 of the housing 86 and through aperture 97 into the interior of the drum 88, filling that drum. When cam 62 (FIG. 2) releases the latch 65, shaft 13 is urged by its spring to rotate rapidly in a clockwise direction to the FIGURE 8 position, thus aligning the opening 97 with the lower bore 98 of housing 86, and permitting discharge of the contents of drum 88, that is, a predetermined amount of batter, onto the griddle 16. Also, due to the eccentric mounting of the drum the valve disc 94 moves downwardly and seals the opening into housing extension 85.

As will readily be seen, when the batter holder 11 is removed from the supporting framework, spring 96 urges the plunger 92 downwardly relatively to the batter holder and the valve 94 closes the batter holder base opening. At this time also, the drum 88 and housing 86 may be removed from the shaft 13, since drum 88 is coupled to the shaft by a detachable coupling member 89, for cleaning and filling, the parts being reassembled by reversing the actions described.

Since the two griddles 16 and 17 and their operating members are identical, a description of one will suffice, reference being had to FIGURES 9 and 10, as well as to FIGURE 1. The griddles 100 are the usual cast griddles bearing channels in their undersurface in which heater elements 101 are suitably placed. Griddles 100 are provided with an integral rim 102, which has bosses 103 at opposite sides thereof. Mounted on the rim 102 and bosses 103 is a spatula ring 104 which is provided with arcuate slots 105. Ring 104 is held to the rim 102 by means of spring-urged clamping pins 106, which extend across the slots 105. Extending through a shouldered bore in each of the bosses 103 is a pin 107, which is connected to the clamping pins 106 at its upper end, and bears a knob 108 at its lower end, a spring 110 being compressed between the shoulder of the bore and the upper end of knob 108. As will be readily seen, this arrangement permits the rotation of the clamping pins 106 so that the ring may be removed from the griddle by aligning the pins with the enlarged ends of the slots 105.

At the left side of the griddle, as seen in FIGURE 9, an electrical plug 111 is provided, the plug terminals thereof designated 112 being connected by suitable leads such as 113 to the heater element. The shafts 14 and 15 are hollow and the leads to sockets mounted on the ends of these shafts extend through the shafts as is indicated in FIGURES 1 and 2.

The griddles 100 also have rearwardly extending bosses 114, which bosses cooperate with clamping members not shown, to clamp the griddles to the shaft ends with the plugs in position in the sockets, which as stated, are mounted for rotation with the shaft. Mounted on the spatula rings 104 are arc segments 115, which on their lower surface, carry beveled teeth. These gear segments mesh with the bevel gear elements 116 which are fixed to the frame and are positioned concentrically to the shafts 14 and 15.

The spatula rings 104 carry spatula fingers 109, which fingers bear against the baking surface of the griddle. It will be seen therefore that as the griddles are oscillated through 180 degrees of arc under drive of the chains and springs, the rings 105 are caused to oscillate about the center of the griddle, causing the fingers to move under the edges of a pancake which has been baked, and to loosen it so that there is assurance that when the griddle is in its reversed position, the pancake will be discharged therefrom.

It should be noted at this point that the griddles 100 are preferably coated with Teflon on their upper surface to minimize sticking and that the spatula fingers are likewise coated, both to minimize sticking and to assure that the fingers will not damage the coating on the griddle proper. It should also be noted that the griddle is provided with a cover 99 on its lower side to protect the heating element and to minimize the loss of heat from the griddle. In addition, thermostatic elements, not shown, are mounted in contact with the underside of the griddle and control the supply of current to maintain the temperature of the griddles at a predetermined setting, preferably of the order of 450° F.

Referring now to FIGURE 12, the schematic wiring diagram of the device, it will be seen that when the main switch 120 is closed the griddles 16 and 17 are heated under control of the thermostats 121. When the griddles have reached baking temperature, the thermostat operate and the neon indicator lights 122 become lighted.

At this time the operator may operate the start switch 123, which will result in the completion of a circuit through the winding of relay 124 and the normally open contacts of microswitch 125 which are closed at this time, due to the fact that microswitch 125 is placed with its actuator 126 (FIG. 1) bearing against the edge of a cam 127 fixed on the cam shaft 18. Relay 124 thus operates. Upon operation, relay 124 completes a circuit through the motor 21, at the same time completing a circuit through its locking contact and winding so that it continues to be energized, despite the fact that the operation of pushbutton 123 may be but momentary.

Shortly after the motor commences to operate, the cam 127 rotates sufficiently so that the microswitch actuator moves to its normal position, causing a contact to complete a circuit through the winding of relay 128. Thereupon the contacts of relay 128 close, continuing the energization of the motor 21. At the same time, the circuit to the winding of relay 124 is opened but the motor continues energized through contacts of relay 128 until the cam 127 returns to the starting position, at which time the microswitch actuator 126 again moves, restoring the circuit to the condition in which it is shown in the diagram. The motor's speed and the gearing may be varied so that the cam shaft 21 makes a complete revolution in from about three to about four minutes.

The operation of the device is believed to be sufficiently described hereinabove. However, in order to clarify some of the details of operation, reference is made to the timing diagram FIGURE 11. As will be seen from that figure, shortly after the motor starts, cam 62 releases the latch 65 and spring 50 drives the meter shaft 13 rapidly through 180 degrees, thus causing the batter metering valve to open and to drop a measured amount of batter onto the griddle 16; the griddle 16 being heated at the time the batter starts to bake. During the baking interval, the drive pin for the batter valve 12 is engaged by the chain roller and the meter shaft 13 is restored to its normal position with the latch engaging the latch pin and holding the shaft in that position against the pressure of its spring. As shown in the diagram the batter meter valve does not restore to its initial position until after a considerable period of time. If desired, however, the valve may be restored earlier provided only that sufficient time is available for the batter in drum 88 to be substantially completely discharged.

Approximately 42 to 54 seconds after the batter has been deposited on the upper griddle 16, the shaft of that griddle is caused to rotate under spring drive due to release of its latch 66 under drive of cam 61 (see FIG. 6). The griddle is then rotated through 180 degrees, the spatula being oscillated in one direction, and the pancake on that griddle is discharged and falls on the surface of the lower griddle 17.

Immediately after the griddle 16 has reached its fully upside-down position, the drive roller on the associated chain engages the drive pin and restores the griddle to its upper position, likewise of course, returning the spatula ring and fingers to their normal position. Substantially immediately after this occurs, the next lobe of the cam 62 (see FIG. 5) again actuates latch 65, again causing a measured amount of batter to be deposited on griddle 16, where baking immediately starts.

Next, the cam 60 actuates the latch 67, thereby causing the lower griddle to rotate and its spatula fingers to oscillate to discharge the fully baked pancake. The drive roller for this shaft immediately thereafter engages the drive pin and the lower griddle 17 is returned to its upright position. Immediately thereafter the upper griddle 16 is released, discharging the second pancake onto griddle 17. Griddle 16 immediately restores in the manner previously described and immediately thereafter the meter shaft is again released and batter deposited on the upper griddle 16. After another baking interval of approximately 42 to 54 seconds, the lower griddle is again actuated and restored, immediately following which the upper griddle is actuated and restored.

The actuation of the upper griddle serves to discharge the third pancake onto lower griddle 17, on which it remains for the baking interval of 42 to 54 seconds, after which time the cam again releases the griddle to discharge the third pancake onto the plate beneath it, the spatula fingers oscillating in the manner heretofore described. As before, the griddle is substantially immediately caused by its drive pin to return to an upright position, and substantially coincidentally therewith, the microswitch 125 is actuated and the motor stops. While the time for a complete cycle of operation depends on a number of variables such as the batter itself, the griddle temperature, the batter viscosity, etc., I have found that with the thermostat set at a temperature of 450° F., and using a preferred batter, the total time elapsed from the deposit of batter on the first griddle to the discharge of the completed pancake from the second griddle, is about three minutes, this total time interval allowing from 40 to 45 seconds for baking of each side of each pancake. Further, the machine can be reactivated immediately upon stopping and it will be only a few seconds before the first pancake is deposited on the griddle, and the baking cycle again initiated.

To summarize, my invention comprises an automatic pancake baker which is more rapid in operation than such pancake bakers which have been devised in the past and which furthermore, is so arranged that the machine is started in operation by closing a circuit by means of a momentary depression of a pushbutton, and operates through a cycle in which it bakes a predetermined number of pancakes, after which it automatically stops. In particular, the increased rapidity of operation of the machine is brought about by the fact that the batter metering valve and griddles are operated under spring drive so that they move from the initial to a discharge position almost instantaneously, the griddles being restored very rapidly by virtue of the chain roller and shaft pin arrangement. Also, the reliability of operation is increased by virtue of the fact that the pancakes are prevented from sticking to the griddle when it has turned to discharge a pancake, since as it turns to this position, spatula fingers are oscillated over the surface of the griddle, thus assuring that the pancake will be released. Additionally, a detachable metering valve has been provided, thus facilitating cleaning of the batter hopper and valve and filling of the hopper.

It will be obvious from the above that many variations in the machine may be made. For example, lobed cams might be substituted for the drive, latch and stop pins; the means for mounting the elements might be modified, etc. Therefore, while I have described a preferred embodiment of my invention, it will be understood that I wish to be limited not by the foregoing description, but solely by the claims granted to me.

What is claimed is:

1. In an automatic pancake baker of the type having a batter holder, a valve means for discharging metered amounts of batter from said holder, a first griddle onto which a metered amount of batter is discharged from the valve means for baking on a first side, and a second griddle on which a partially baked pancake is discharged from the first griddle to be baked on a second side and then discharged, the improvement residing in means for oscillating the metering valve, and first and second griddle, between an initial and a discharge position, comprising, in combination, a shaft for said valve and for each said griddle, means rotatably mounting said shafts with said valve and griddles in vertical alignment, spring means on each shaft urging said valve and griddles to discharge position, latch means for said valve and each said griddle, each said latch means comprising a radial projection on the corresponding shaft and a latch cooperating therewith, drive means for said valve and griddles, said drive means comprising a chain extending over a sprocket rotatably mounted on the corresponding shaft, a drive roller mounted on the chain, and a radially extending projection on each said shaft in position to be engaged by said chain roller, a cam shaft having cams cooperating with said latches and operable to release the same, and motor means driving said cam shaft and said chains at predetermined related speeds.

2. An automatic pancake baker as claimed in claim 1 wherein said shafts carry stop projections extending radially therefrom and wherein an adjustable stop screw is positioned adjacent each said projection to determine the discharge position of the corresponding shaft.

3. An automatic pancake baker as claimed in claim 2 wherein said shaft projection engageable by said chain roller and said stop projection are displaced substantially 180° one from the other.

4. An automatic pancake baker as claimed in claim 1 wherein said drive rollers and said cams are positioned relative to each other so that during each rotation of said cam shaft said metering valve operates, discharging batter on said first griddle, said metering valve closes, said first griddle operates, discharging a pancake baked on one side onto said second griddle, said first griddle restores to initial position, said metering valve opens, discharging batter for a second pancake on said first griddle, said metering valve closes, said second griddle operates, discharging a first fully baked pancake, said second griddle restores to initial position, said first griddle operates, discharging the second partially baked pancake onto said second griddle, said first griddle restores to initial position, said metering valve operates depositing batter for a third pancake on said first griddle, said metering valve closes, said second griddle operates, discharging the second fully baked pancake, said second griddle restores to initial position, said first griddle operates discharging the third partially baked pancake onto said second griddle, said second griddle operates, discharging the third fully baked pancake and said second griddle restores to initial position.

5. An automatic pancake baker as claimed in claim 4 wherein said cam shaft has a fourth cam fixed thereto, circuit means comprising a switch having its actuator operated by said fourth cam, said circuit means also including a manually operated pushbutton and means responsive to operation thereof to energize said motor to thereby operate said cam shaft, closing said switch, said switch remaining closed until said cam opens it at the end of a revolution to deenergize said motor.

6. An automatic pancake baker as claimed in claim 1 wherein said spring means comprises a planar coiled spring, one end of said spring being fixed to the corresponding shaft and the other end to a fixed point.

7. An automatic pancake baker as claimed in claim 1 wherein at least one of said griddles is provided with spatula means for assuring release of a pancake from the baking surface, said spatula means comprising, a ring mounted for oscillation concentrically of said griddle, spatula means mounted on said ring and extending in contact with the surface of said griddle, a sector mounted on said spatula ring and an annular element fixedly mounted concentric to said griddle shaft in engagement with said sector, said element cooperating with said sector to cause oscillation of said spatula ring as said griddle is moved from initial to discharge position and returned.

8. An automatic pancake baker as claimed in claim 7 wherein said sector is a gear sector and wherein said annular element is a gear sector, said gear sectors interengaging.

9. An automatic pancake baker as claimed in claim 7 wherein said spatula means comprises fingers spaced about the periphery of said ring and extending inwardly toward the center of said griddle.

10. An automatic pancake baker as claimed in claim 1 wherein the batter holder comprises a container having a tubular member extending downwardly therefrom in communication with the interior thereof and wherein the batter metering valve comprises a housing having a tubular extension extending upwardly therefrom and fitting within said tubular member of said holder, a chamber in said housing extending transversely to said tubular extension, a hollow drum mounted in said chamber, said drum being provided with an opening in its periphery communicating in one rotational position thereof with said tubular extension, whereby batter may flow from said holder to fill said drum, and an aperture in said housing in diametrical alignment with said tubular extension and on the opposite side of said chamber, and means mounting said drum on said valve shaft to be actuated from said filling position to position to discharge through said aperture.

11. A pancake baker as claimed in claim 10 wherein said drum is mounted eccentrically on said shaft and wherein a spring-urged disc is mounted in said batter holder in position to seal the upper end of said batter holder tubular member, said disc having a plunger in contact with the upper end of said first housing extension whereby when said housing is in its upper position and said drum in filling position, said disc is moved off its seat and when said drum is in discharge position said disc is urged against its seat by said spring.

12. A pancake baker as claimed in claim 11 wherein said batter holder is detachably mounted on said pancake baker and said drum is detachably mounted on said valve meter shaft to permit separation of said holder and said metering valve.

13. In an automatic pancake baker of the type having a batter holder, valve means for discharging measured amounts of batter from said holder, a first circular griddle vertically aligned with said valve to receive batter discharged from the valve means for baking on one side, a second circular griddle vertically aligned with said first griddle to remove a pancake baked on one side from said first griddle, bake said pancake on the second side and discharge it, and in which said valve and griddles are mounted for oscillation through substantially 180°, the improvement residing in spatula means mounted on at least one of said griddles to release a baked pancake therefrom, said spatula means comprising, a ring mounted for oscillation concentrically to said griddle, spatula fingers mounted on said ring and extending into contact with the surface of said griddle, and an annular element mounted concentrically about the corresponding griddle shaft, said annular element frictionally engaging said ring whereby said spatula fingers are caused to move over the surface of the griddle as the griddle is oscillated to discharge position.

14. An automatic pancake baker as claimed in claim 13 wherein said ring comprises a gear segment and wherein said annular element comprises a gear segment, said gear segments interengaging.

15. An automatic pancake baker as claimed in claim 13 wherein said spatula fingers are spaced about said ring and extend radially inward toward the center of said griddle.

References Cited

UNITED STATES PATENTS

| | | | |
|---|---|---|---|
| 1,869,539 | 8/1932 | Brand | 99—423 |
| 2,830,529 | 4/1958 | Jaffe | 99—423 |
| 3,092,014 | 6/1963 | Macchi | 99—423 |
| 3,215,062 | 11/1965 | Frankenberg | 99—424 XR |
| 3,225,716 | 12/1965 | Krooss et al. | 99—423 XR |

WALTER A. SCHEEL, *Primary Examiner.*

J. M. NEARY, *Assistant Examiner.*